United States Patent
Biberstein et al.

(10) Patent No.: US 9,087,150 B2
(45) Date of Patent: Jul. 21, 2015

(54) PERFORMANCE ANALYSIS SYSTEM FOR ANALYZING INTER-THREAD COMMUNICATIONS TO ENHANCE PERFORMANCE IN MULTITHREADED SYSTEM

(75) Inventors: Marina Biberstein, Haifa (IL); Andre Heilper, Haifa (IL); Javier Merino, Cantabria (ES)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 13/310,815

(22) Filed: Dec. 5, 2011

(65) Prior Publication Data
US 2013/0145369 A1     Jun. 6, 2013

(51) Int. Cl.
*G06F 9/46*      (2006.01)
*G06F 11/34*     (2006.01)

(52) U.S. Cl.
CPC ........ *G06F 11/3466* (2013.01); *G06F 11/3409* (2013.01)

(58) Field of Classification Search
CPC .......................... G06F 11/3409; G06F 11/3466
See application file for complete search history.

(56) References Cited

U.S. PATENT DOCUMENTS

| | | | |
|---|---|---|---|
| 5,745,778 A | 4/1998 | Alfieri | |
| 7,409,679 B2 | 8/2008 | Chedgey et al. | |
| 7,765,094 B2 | 7/2010 | Bodden et al. | |
| 7,802,236 B2 | 9/2010 | Calder et al. | |
| 2006/0282839 A1* | 12/2006 | Hankins et al. | 719/318 |
| 2008/0163240 A1* | 7/2008 | Aguilar et al. | 718/107 |
| 2008/0209433 A1* | 8/2008 | McKenney | 718/104 |
| 2008/0216098 A1 | 9/2008 | Agarwal et al. | |
| 2009/0177642 A1 | 7/2009 | Chung et al. | |
| 2009/0307704 A1 | 12/2009 | Munshi et al. | |
| 2009/0320021 A1 | 12/2009 | Pan et al. | |
| 2010/0153966 A1* | 6/2010 | Arimilli et al. | 718/105 |
| 2011/0231854 A1* | 9/2011 | Augenstein et al. | 718/103 |
| 2011/0264410 A1 | 10/2011 | Biberstein et al. | |

OTHER PUBLICATIONS

Tam et al., "Thread Clustering: Sharing-Aware Scheduling on SMP-CMP-SMT Multiprocessors", In Proceedings of the EuroSys Conference, pp. 47-58, 2007.

* cited by examiner

*Primary Examiner* — Abdullah Al Kawsar
*Assistant Examiner* — James J Lee
(74) *Attorney, Agent, or Firm* — David M. Quinn; Suzanne Erez

(57) ABSTRACT

Systems and methods for enhancing performance in a multi-threaded computing system are provided. The method comprises receiving a plurality of values associated with a performance characteristic common to a plurality of threads; clusterizing the plurality of threads based on the performance characteristic; analyzing an inter-thread communication between the plurality of threads for identifying a plurality of threads adversely affecting the performance of different parts of the multithreaded program; calculating a performance factor corresponding to the performance characteristic to determine a type of performance improvement activity to be performed on the plurality of threads.

15 Claims, 6 Drawing Sheets

PERFORMANCE ANALYSIS SYSTEM FOR ANALYZING INTER-THREAD COMMUNICATIONS TO ENHANCE PERFORMANCE IN MULTITHREADED SYSTEM

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to a performance analysis of multithreaded systems in a computing environment, and more particularly to a system and method for aggregating threads and analyzing inter-communication between threads.

BACKGROUND

In multi-processing environments, it may be desirable to enhance the overall performance of a multithreaded system or program. In a massively multithreaded system, determining the appropriate optimization approach may become very difficult and cumbersome due to the variations in the performance characteristics of individual applications and the large number of threads that are concurrently executed. Indeed, individual analysis of each single thread will be a daunting task.

Instead of analyzing each thread individually, the analysis may be performed collectively (i.e., by way of aggregated analysis). An aggregation approach, however, does not always yield a proper solution because important data that is applicable to individual threads may be abstracted away. For example, if a relatively large number of secondary threads are underperforming, due to problems associated with an individual primary thread that services them, an aggregated analysis would reflect that the multitudes of secondary threads are slightly underperforming, while obscuring significant underperformance associated with the primary thread.

In the above example, if the underperformance of the primary thread goes undetected, then a human operator, such as a system administrator, will mistakenly focus on optimizing the secondary threads instead, a prospective solution that would not lead to an improvement of the overall performance of the system. As such, one would appreciate that in a massively multithreaded environment, it is important to identify and select the appropriate threads for optimization.

Furthermore, the modern computing systems are so complex that substantial time and extensive understanding of the involved software, hardware, and the relevant tools are essential to performing a proper analysis of all system aspects that possibly affect performance, and the degree in which such factors affect performance. Therefore, it is desirable to have a tool that can help automatically focus the optimization efforts in a more promising direction.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for enhancing performance in a multithreaded computing system are provided. The method comprises receiving a plurality of values associated with a performance characteristic common to a plurality of threads; clusterizing the plurality of threads based on the performance characteristic; analyzing an inter-thread communication between the plurality of threads for identifying a plurality of threads adversely affecting the performance of different parts of the multithreaded program; calculating a performance factor corresponding to the performance characteristic to determine a type of performance improvement activity to be performed on the plurality of threads.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
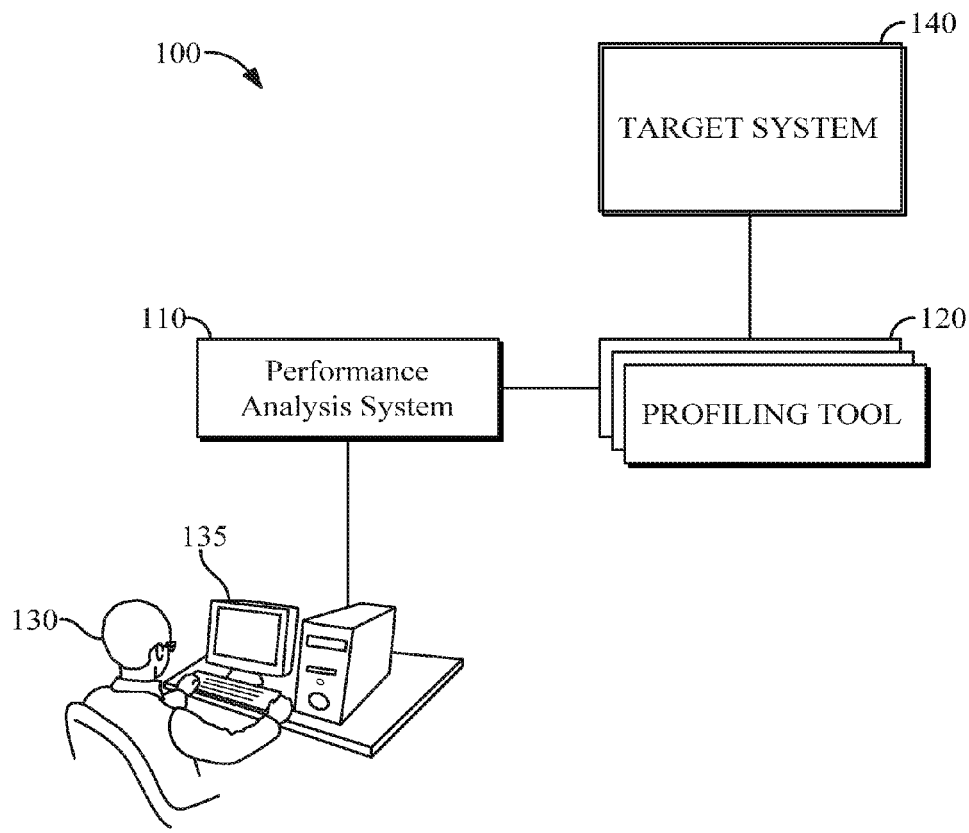
FIG. 1 illustrates a multithreaded environment in which a target system is optimized, in accordance with one or more embodiments.

Referring FIG. 1, a multithreaded computing environment 100 is illustrated in which an performance analysis system 110 is configured to analyze the performance of a target system 140 and optionally optimize components (e.g., threads) in the target system 140 that may be underperforming. The target system 140, depending on implementation, may comprise one or more servers, clients, multi-core processors, multi processor computers or the like (not shown in FIG. 1).

The performance analysis system 110 may receive data from profiling tools 120 to determine performance characteristics and performance values for various components in the target system 140. Exemplary profiling tools include operating system commands (e.g., Unix "sar" command) used to report on various system loads, processor activity, memory, paging, device load, network bandwidth, etc. Other commands (e.g., Unix "ps" command) may be used to detect the actively executing threads or processes. System tools (e.g., Linux "OProfile") may be also used to sample and count cache misses, stalls, memory fetches, interrupts, etc.

According to one embodiment, the performance analysis system 110 utilizes the performance values or performance characteristics collected from the profiling tools 120 to determine performance factors that may help enhance the performance of the target system 140 in, for example, a massively multithreaded environment. A human or an automated machine operator (e.g., a user 130) may use an interface 135 to view the performance factors determined by the performance analysis system 110 and accordingly decide to improve the performance of the target system 140 as needed.

Figure 2:
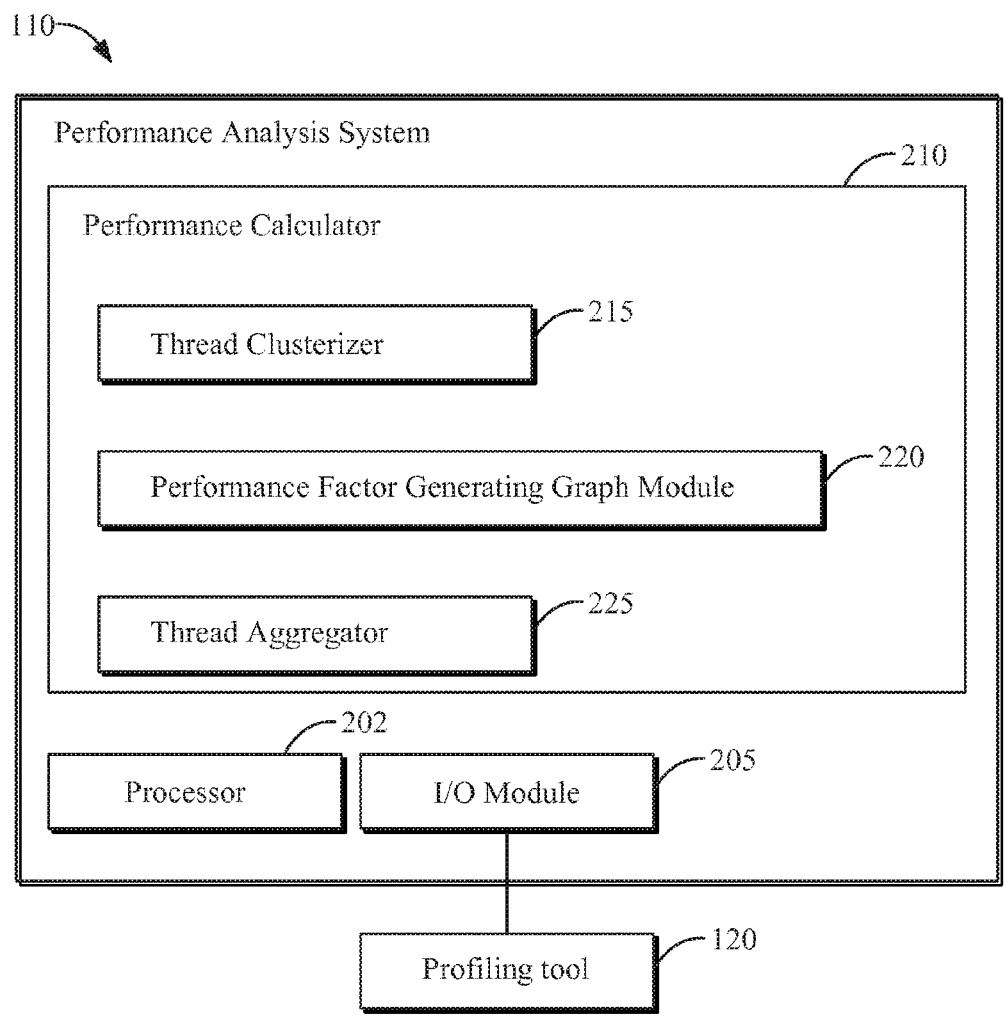
FIG. 2 is a block diagram of an performance analysis system, in accordance with one embodiment.

Referring to FIG. 2, performance analysis system 110 may be configured to determine the performance factors corresponding to the threads in the target system 140. For example, performance analysis system 140 may include a performance calculator 210 to calculate the performance characteristics in a multithreaded environment. The performance characteristics of individual threads may include instructions per cycle or the amount of time spent in blocking input/output (I/O), which may differ across threads.

In accordance with one embodiment, the performance analysis system 110 may further include a thread clusterizer 215 configured to clusterize a plurality of threads in the target system 140. As provided in further detail below, averaging the threads followed by the clusterization helps discover the relationships and dependencies among the multiple threads and keeps the number of threads manageable as well as limiting the possibility of abstracting away important parts or details of the performance behavior for individual threads.

The performance analysis system 110 may further include a performance factor generating graph module 220 configured to visually quantify the discovered dependencies among the threads by way of, for example, generating one or more graphs. The generated graphs may include a directed acyclic graph that helps quantify the dependencies that identify the strongly connected components and aggregate (e.g., collapse or unify) components that are closely related. In this manner, the cyclical dependencies among multiple threads and the inter-dependencies among thread clusters may be identified.

In accordance with one implementation, the performance analysis system 110 further includes a thread aggregator 225 configured to aggregate a group of threads running in an individual cluster or a group of threads contributing to a root cause in a cluster. Aggregation of multiple related threads in one or more groups helps determine the common performance factors for the threads collectively so that a performance improvement activity may be performed on the target system 140 as provided in further detail below.

A processor 202 and an I/O module 205 may be included in the performance analysis system 110 to respectively process and receive, retrieve or otherwise obtain values of one or more performance characteristics provided by a profiling tool 120. The I/O module 205 may be utilized to provide an output that includes the calculated performance factor associated with a performance characteristic. The output may include a suggestion on which performance improvement activity is to be performed.

Figure 3:
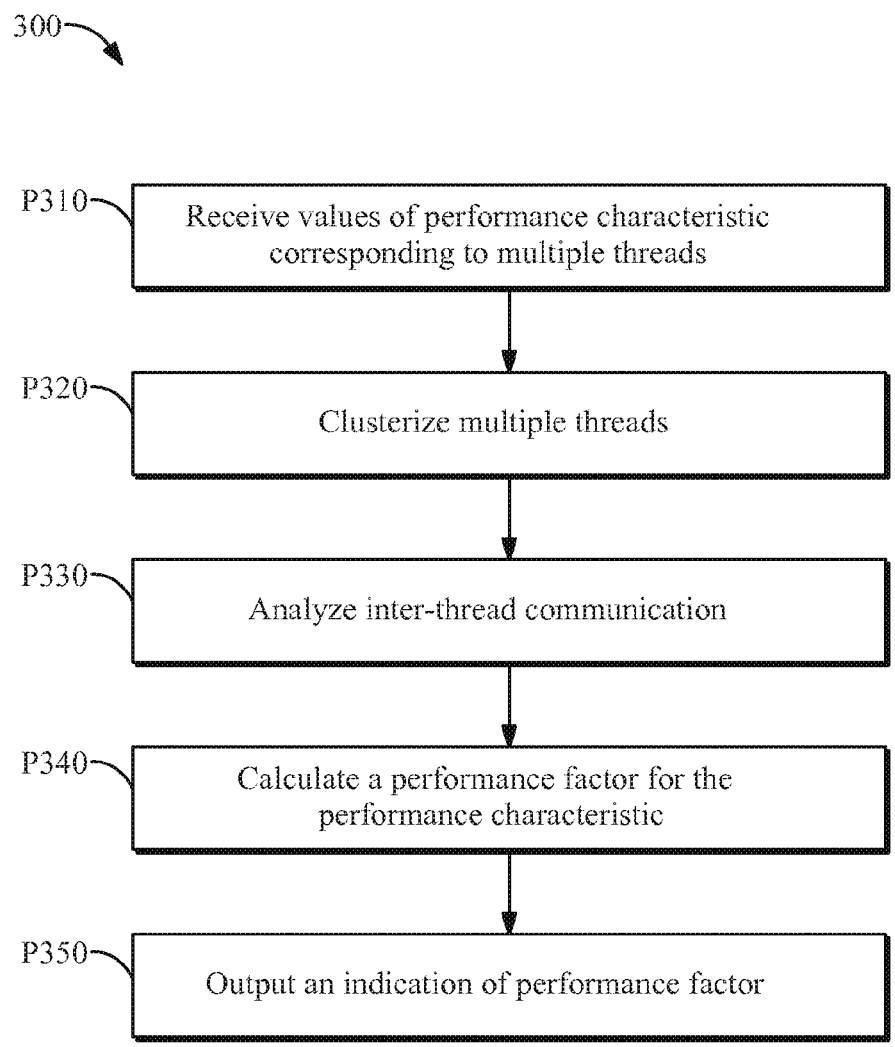
FIG. 3 is a flow diagram of a method of analyzing performance of a target system in a multithreaded environment, in accordance with one embodiment.

Referring to FIGS. 1 through 3, a method 300 in accordance with one embodiment is provided to analyze the performance of a target system 140 in a multithreaded environment 100. The I/O module 205 may be utilized to receive from the profiling tool 120 values of performance characteristics that correspond to multiple threads executed over target system 140 (P310). The multiple threads may be then clusterized by thread clusterizer 215 based on the performance characteristics associated with the threads of the target system 140 (P320).

An inter-thread communication analysis may be performed by the performance factor calculator 210 to identify threads that are affecting performance (e.g., delaying the generation of data associated with other parts of a multithreaded program) of the target system 140 (P330). The performance factor calculator 210 may also calculate the performance factors associated with the performance characteristics provided by the profiling tool 120 to determine the type of performance improvement activity that is to be performed on the threads under analysis (P340).

Accordingly, an indication of the performance factors is outputted by way of I/O module 205 (P350). The performance factors report performance characteristics and values that, for example, may include suggestions on how to improve performance. In some exemplary embodiments, performance improvement activities may be selected based on one or more calculated performance factors. The selected performance improvement activity may be performed and the target system 140 may be modified accordingly. Further modifications may be suggested or performed as new performance characteristics are collected for the modified system.

Figure 4:
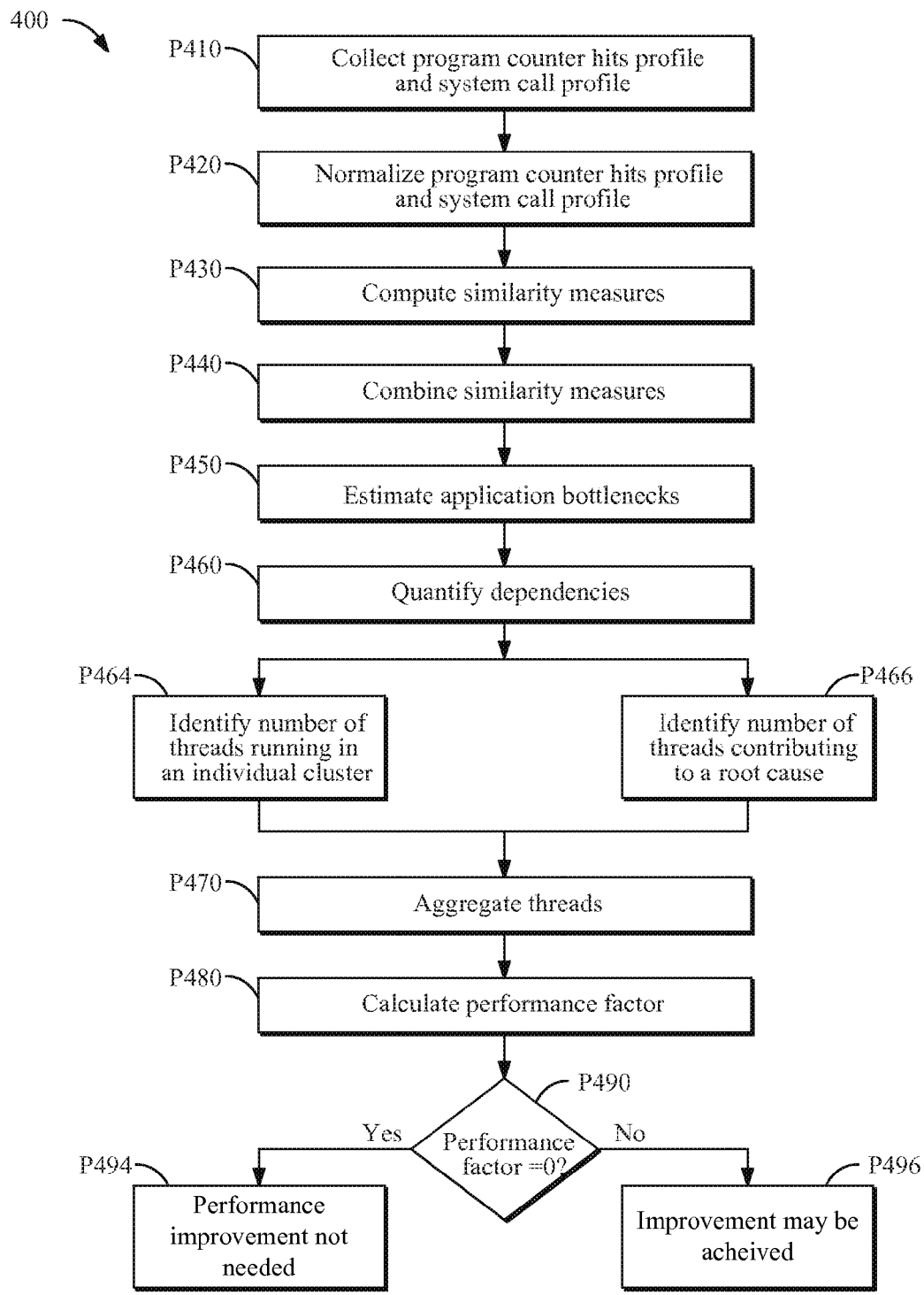
FIG. 4 is a flow diagram of a method of optimizing a target system in a multithreaded environment, in accordance with one embodiment.

Referring to FIG. 4, a method 400 for improving system performance, in accordance with one embodiment, is provided. To clusterize the plurality of threads, the I/O module 205 may be utilized to collect the program counter hits profile and the system call profile for each thread from the profiling tool 120 (P410). The program counter hits profile and the system call profile for a plurality of threads are normalized and the similarity measures for two or more threads is computed by the thread clusterizer 215 (P420, P430).

For example, assume that $P(i,t)$ is a function that provides the normalized number of hits by thread t at location i. The similarity measure for exemplary threads t1 and t2 would be the sum over the locations i having 2 vectors, such that a vector represents the address space along with an indication of how many times a thread while being actively executed by a processor has accessed an address in the address space. For example P(0,t1) indicates how many times address zero was visited by thread t1.

The above function helps to distinguish between the threads. Based on the above function if two threads represent the same behavior (e.g., have visited an address in the address space approximately the same number of times) then, optionally, one of the two threads is used for the purpose of clustering (i.e., the two threads are collapsed together). The similarity of behavior among threads may depend on the similarity measures chosen. For example, if the value of abs(P(i,t1)−P(i,t2)), if abs(P(i,t1)−P(i,t2))>min(P(i,t1), P(i,t2)), then false similarities are filtered out when a commonly or frequently visited address (i.e., hotspot) for one thread is also visited by another thread. If so the similarity measure may be deemed to be zero, for example.

Once the similarity measures for the threads is computed, the similarity measures corresponding to selected threads is combined (P440). The computed similarity measures may provide an estimate for the bottlenecks associated with one or more threads in a cluster (P450). The estimation of the bottlenecks may be performed by monitoring thread interaction, recording the number of threads waiting on a type of resource in the target system 140 or recording the number of threads enabled to free up a type of resource. The monitoring and the recording may provide data that helps display the communication flow between the threads and the clusters in the form of one or more dependency graphs.

A visual quantification of the observed dependencies may be performed by the performance factor generating graph module 220 (P460). Such quantification may help identify the number of threads running in an individual cluster or the number of threads contributing to a root cause in a cluster (P464, P466). The performance factor generating graph module may generate one or more graphs that may include a directed acyclic graph. The directed acyclic graph helps to identify the strongly connected components and collapse components that are related.

Accordingly, the number of threads running in an individual cluster and the number of threads contributing to a root cause in the cluster may be aggregated by, for example, thread aggregator 225 (P470). Further, the performance factor calculator 210 may be used to calculate the performance factor (P480) or the performance characteristics corresponding to the threads in the target system 140 for the aggregated number of threads in one or more clusters in the target system 140. Calculation of the performance factor may include attaching weight factors to the aggregated number of threads.

Depending on the value of the calculated performance factor (e.g., if the performance factor is equal to zero), an indication of the calculated performance factor or the performance characteristics may be provided to the user 130 by way of I/O module 205 (P490). For example, if the performance factor meets a certain threshold, then the output provided may indicate that the system or a thread is not in need of performance improvement (P494) or otherwise indicate that a certain performance improvement activity may lead to improved performance for an identified thread (P496).

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 5A:
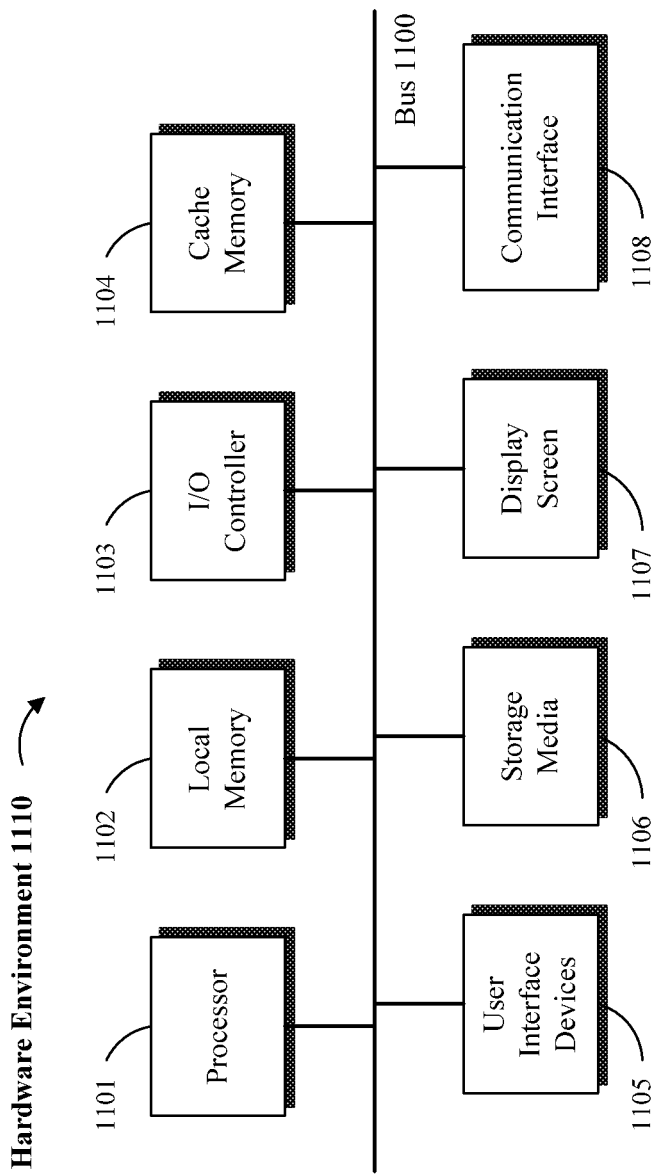
FIGS. 5A and 5B are block diagrams of hardware and software environments in which the disclosed systems and methods may operate, in accordance with one or more embodiments.
Figure 5B:
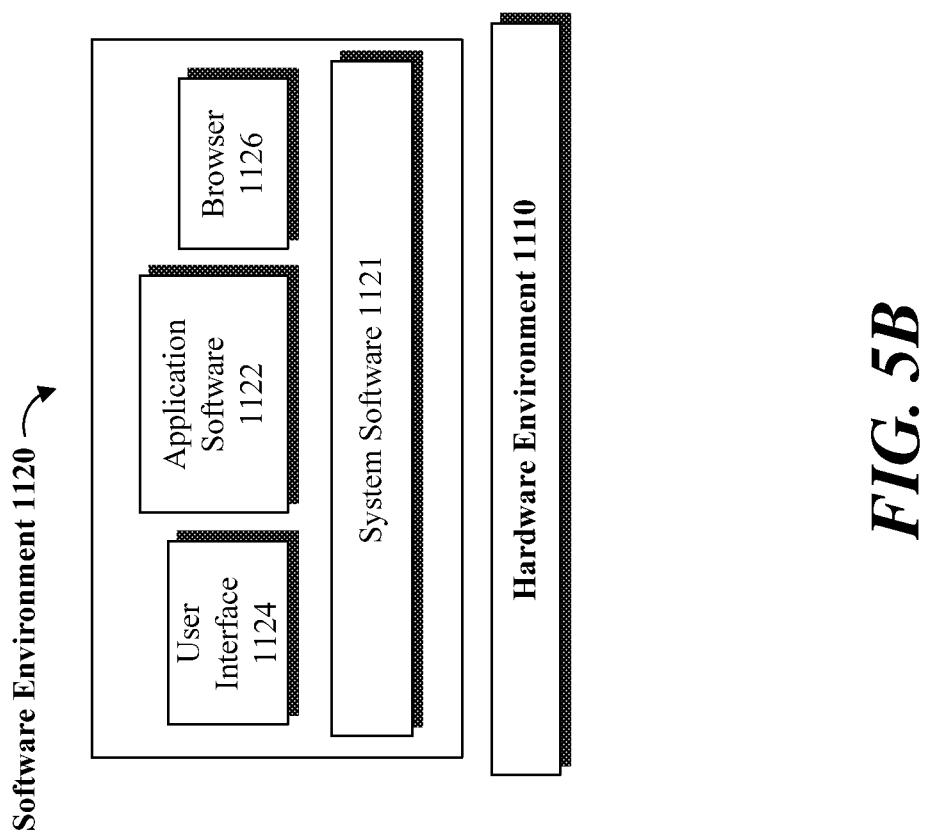

Referring to FIGS. 5A and 5B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 5A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 5B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer implemented method for enhancing performance in a multithreaded computing system, the method comprising:
   receiving a plurality of values associated with a performance characteristic common to a plurality of threads in a multithreaded computing system, wherein the performance characteristic of the plurality of threads is based, at least in part, on number of instructions per cycle, and wherein the performance characteristic is determined utilizing a profiling tool;
   clusterizing the plurality of threads based on the performance characteristic to group the plurality of threads, wherein the performance characteristic indicates that the plurality of threads represent an address space access behavior;
   analyzing inter-thread communication between the plurality of threads to identify threads that are adversely affecting performance in the multithreaded computing system;
   providing one or more dependency graphs for analyzing inter-thread communication;
   calculating a performance factor corresponding to the performance characteristic to determine a type of performance improvement activity to be performed on the plurality of threads; and
   performing the type of performance improvement activity to enhance performance of the multithreaded computing system.

2. The method of claim 1 further comprising combining a plurality of similarity measures obtained from a pair of threads among the plurality of threads.

3. The method of claim 1 further comprising estimating the plurality of threads constituting an application bottleneck.

4. The method of claim 3 further comprising:
   monitoring an interaction between the plurality of threads;
   recording number of the plurality of threads waiting on a type of resource; and
   recording number of the plurality of threads enabled to free up the type of resource.

5. The method of claim 1 further comprising quantifying a plurality of dependencies among the plurality of threads by way of the one or more dependency graphs.

6. The method of claim 5 further comprising collapsing a plurality of dependencies in to a single node in the one or more dependency graphs.

7. The method of claim 1, wherein calculating a performance factor comprises identifying a number of threads running in an individual cluster.

8. The method of claim 1, wherein calculating a performance factor further comprises identifying a number of threads contributing to a root cause.

9. The method of claim 1, wherein calculating a performance factor comprises aggregating the number of threads running in an individual cluster and the number of threads contributing to a root cause.

10. A system to enhance performance of a multithreaded program, the system comprising:
    one or more computer processors;
    a receiver configured to receive one or more values associated with a performance characteristic for a plurality of threads in a multithreaded program, wherein the performance characteristic for the plurality of threads is based, at least in part, on number of instructions per cycle, and wherein the performance characteristic is determined utilizing a profiling tool;

a component configured to clusterize the plurality of threads into a group based on the performance characteristic to group the plurality of threads, wherein the performance characteristic indicates that the plurality of threads represent an address space access behavior;

a performance factor calculator configured to analyze inter-thread communication between the plurality of threads to identify threads that are adversely affecting performance in the multithreaded program;

a performance factor generating graph module configured to provide one or more dependency graphs for analyzing inter-thread communication;

the performance factor calculator further configured to calculate a performance factor corresponding to the performance characteristic common to the plurality of threads and to determine, based on the performance factor, a type of performance improvement activity to be performed on the plurality of threads;

an output module configured to provide an indication of the performance factor; and the one or more processors configured to perform the type of performance improvement activity to enhance performance of the multithreaded program.

11. The system of claim 10, wherein the receiver is enabled to utilize the profiling tool.

12. The system of claim 11, wherein the profiling tool is configured to determine a value corresponding to the performance characteristic.

13. The system of claim 10, wherein the performance factor calculator further comprises the performance factor generating graph module.

14. The system of claim 13, wherein the performance factor generating graph module is enabled to quantify a plurality of dependencies among the plurality of threads.

15. A computer program product comprising logic code embedded in a non-transitory data storage medium, wherein execution of the logic code on a computing system causes the computing system to:

receive a plurality of values associated with a performance characteristic common to a plurality of threads in a multithreaded computing system, wherein the performance characteristic of the plurality of threads is based, at least in part, on number of instructions per cycle, and wherein the performance characteristic is determined utilizing a profiling tool;

clusterize the plurality of threads based on the performance characteristic to group the plurality of threads, wherein the performance characteristics indicates that the plurality of threads represent an address space access behavior;

analyze inter-thread communication between the plurality of threads to identify threads that are adversely affecting performance in the multithreaded computing system;

provide one or more dependency graphs for analyzing inter-thread communication;

calculate a performance factor corresponding to the performance characteristic to determine a type of performance improvement activity to be performed on the plurality of threads; and perform the type of performance improvement activity to enhance performance of the multithreaded computing system.

* * * * *